(12) United States Patent
Zhou

(10) Patent No.: US 11,127,383 B1
(45) Date of Patent: *Sep. 21, 2021

(54) MUSICAL NOTATION SYSTEM

(71) Applicant: Jianxun Zhou, Xuzhou (CN)

(72) Inventor: Jianxun Zhou, Xuzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/856,909

(22) Filed: Apr. 23, 2020

(51) Int. Cl.
*G10G 1/02* (2006.01)
*G09B 15/02* (2006.01)

(52) U.S. Cl.
CPC ............... *G10G 1/02* (2013.01); *G09B 15/02* (2013.01)

(58) Field of Classification Search
CPC .................................. G10G 1/02; G09B 15/02
See application file for complete search history.

(56) References Cited

U.S. PATENT DOCUMENTS

| | | | | |
|---|---|---|---|---|
| 1,526,547 A * | 2/1925 | Hughey | ............... | G09B 15/026 84/471 R |
| 2,381,347 A * | 8/1945 | Gudkov | ................. | G09B 15/08 84/478 |
| 4,416,182 A * | 11/1983 | Wise | ....................... | G09B 15/08 273/454 |
| 6,388,182 B1 * | 5/2002 | Bermudez | ............ | G09B 15/026 84/470 R |
| 6,870,085 B2 * | 3/2005 | MacCutcheon | ...... | G09B 15/023 84/477 R |
| 6,987,220 B2 * | 1/2006 | Holcombe | ........... | G09B 15/026 84/483.2 |
| 7,453,036 B1 * | 11/2008 | Henkel | ................ | G09B 15/003 84/470 R |
| 8,697,974 B1 * | 4/2014 | Fajardo | .................. | G09B 15/00 84/477 R |
| 8,916,760 B1 * | 12/2014 | West | ..................... | G09B 15/026 84/483.2 |
| 9,196,171 B2 * | 11/2015 | Nguyen | ............... | G09B 15/026 |
| 9,881,514 B2 * | 1/2018 | Ueoka | ....................... | G10G 7/00 |
| 9,947,238 B2 * | 4/2018 | Tolan | ................... | G09B 15/02 |
| 10,515,614 B2 * | 12/2019 | Zhou | ......................... | G10H 1/34 |
| 2004/0020347 A1 * | 2/2004 | McIntosh | ............. | G09B 15/023 84/477 R |
| 2006/0011044 A1 * | 1/2006 | Chew | ........................ | G10H 1/34 84/609 |

(Continued)

FOREIGN PATENT DOCUMENTS

GB 614743 A * 12/1948 ........... G09B 15/023

*Primary Examiner* — Elvin G Enad
*Assistant Examiner* — Christina M Schreiber
(74) *Attorney, Agent, or Firm* — Getech Law LLC; Jun Ye

(57) ABSTRACT

A musical notation system is disclosed. The musical notation system comprises: a pitch symbol representing a key of a keyboard instrument, wherein the pitch symbol corresponds to a number representing a pitch in a numbered musical notation system, and is displayed in a first form when representing a white key of the keyboard instrument and in a second form when representing a black key of the keyboard instrument; and a duration symbol representing a duration of the pitch symbol, the duration symbol corresponding to a symbol representing a duration in the numbered musical notation system, wherein the pitch symbol representing the black key of the keyboard instrument is assigned a sol-fa name independent of a sol-fa name of the pitch symbol representing the white key of the keyboard instrument.

17 Claims, 10 Drawing Sheets

(56) References Cited

U.S. PATENT DOCUMENTS

| | | | | |
|---|---|---|---|---|
| 2007/0221043 A1* | 9/2007 | Hao | .................... | G09B 15/004 84/477 R |
| 2008/0141849 A1* | 6/2008 | Johnston | ................ | G09B 15/02 84/483.2 |
| 2010/0251875 A1* | 10/2010 | Johnston | ................ | G09B 15/02 84/483.2 |
| 2013/0319207 A1* | 12/2013 | King | ................... | G09B 15/023 84/471 R |
| 2014/0305284 A1* | 10/2014 | Cosgrove | ............ | G09B 15/026 84/478 |
| 2015/0068387 A1* | 3/2015 | Shi | ...................... | G09B 15/023 84/471 R |
| 2016/0210948 A1* | 7/2016 | Kelsey | .................... | G10G 1/04 |
| 2017/0018202 A1* | 1/2017 | Marradi | ............... | G09B 15/023 |
| 2017/0243506 A1* | 8/2017 | Bayadzhan | ............... | G10G 1/00 |
| 2018/0342228 A1* | 11/2018 | Wei | ...................... | G10H 1/0016 |
| 2019/0057676 A1* | 2/2019 | Johnson | .................. | G09B 5/06 |
| 2019/0237049 A1* | 8/2019 | Zhou | .................... | G09B 15/026 |
| 2020/0066239 A1* | 2/2020 | Lee | ........................ | G10G 1/02 |

\* cited by examiner

C major chords:

C minor chords:

C dominant chords:

Fig. 5

| | | | | | | | | |
|---|---|---|---|---|---|---|---|---|
| Natural Major Scale: | 1 | 2 | 3 | 4 | 5 | 6 | 7 | 1̇ |
| Natural Minor Scale: | 6 | 7 | 1 | 2 | 3 | 4 | 5 | 6̇ |
| Harmony Minor Scale: | 6 | 7 | 1 | 2 | 3 | 4 | #5 | 6̇ |
| Chinese Pentatonic Scale : | 1 | 2 | 3 | | 5 | 6 | | 1̇ |
| Japanese Minor Pentatonic Scale: | 1 | | 3 | 4 | | 6 | 7 | 1̇ |
| Classical Melody Minor Scale: | 6 | 7 | 1 | 2 | 3 | #4 | #5 | 6̇ |
| Blues Scale: | 6 | ♭7 | 1 | 2 | ♭3 | 4 | ♭5 | 6̇ |

Blue Love

MUSICAL NOTATION SYSTEM

TECHNICAL FIELD

The present application generally relates to a technical field for recording music, and in particular to a musical notation system.

BACKGROUND ART

Piano, as a basic teaching tool in the musical culture art, plays an irreplaceable role in teaching musical theory, vocal music and instrumental music. However, the piano, as first one of Top Three world instruments, makes ordinary people always look and sigh because of its price and learning difficulty. As economy develops rapidly, the piano is no longer a luxury commodity; especially, currently an inexpensive electronic piano can also meet needs of music lovers with features of a small footprint, adjustable volume and no need for tuning, thus are widely used in music theory, solfeggio and other special music teaching. Accordingly, broad masses are learning piano and other keyboard instruments more and more actively and passionately so as to enrich their own cultural life. It is no need to deny that a traditional piano teaching system is scientific and practical, and has trained a large number of pianists and performers. However, a beginner just getting involved in music is still deterred by a complex stave music theory the traditional piano teaching system relies on. Therefore, how to make a music beginner easier to get into a path of playing the piano becomes a valuable question.

Current music notation systems are based on a natural scale, supplemented by sharps and flats to form various musical styles as required. However, because of introducing sharps and flats as an aid, musical scores become complicated, making reading and singing the scores not easy to master. In addition, it is quite difficult to understand and use chords and modulation.

SUMMARY OF THE INVENTION

In view of the above in the art, the present application is dedicated to provide a musical notation system capable of facilitating reading and singing musical scores, making easier learning, understanding and applying the music theory.

For this purpose, the present application proposes a musical notation system, comprising: a pitch symbol representing a key of a keyboard instrument, wherein the pitch symbol corresponds to a number representing a pitch in a numbered musical notation system, and is displayed in a first form when representing a white key of the keyboard instrument and in a second form when representing a black key of the keyboard instrument; and a duration symbol representing a duration of the pitch symbol, the duration symbol corresponding to a symbol representing a duration in the numbered musical notation system, wherein the pitch symbol representing the black key of the keyboard instrument is assigned a sol-fa name independent of a sol-fa name of the pitch symbol representing the white key of the keyboard instrument.

The present application further proposes a musical notation system, comprising: a grid representing a minimum fixed duration of a note; and a pitch symbol representing a key of a keyboard instrument, wherein the pitch symbol corresponds to a number representing a pitch in a numbered musical notation system, and is displayed in a first form when representing a white key of the keyboard instrument and in a second form when representing a black key of the keyboard instrument, wherein the pitch symbol within the grid represents a note with the pitch having the minimum fixed duration; and wherein the pitch symbol representing the black key of the keyboard instrument is assigned a sol-fa name independent of a sol-fa name of the pitch symbol representing the white key of the keyboard instrument.

With the musical notation system proposed in the present application, with the help of 12 independent sol-fa names, a music beginner can easily read and sing musical scores, making easier learning, understanding and applying the music theory, and enabling to build a more concise music theory system.

BRIEF DESCRIPTION OF THE DRAWINGS

These and/or other aspects and advantages of the present application will become apparent and easy to understand from following detailed descriptions of embodiments of the present application in combination with the accompanying drawings, in which:

FIG. 5 is a schematic view of a musical score by applying a musical notation system according to an embodiment of the present application;

FIG. 6 is a schematic view of scales of various musical styles by applying a musical notation system according to an embodiment of the present application;

FIG. 7A and FIG. 7 compare a musical score in a legacy numbered musical notation with that in a musical notation system according to an embodiment of the present application;

FIG. 8 is a schematic view of major scales by applying a musical notation system according to an embodiment of the present application;

FIG. 9A and FIG. 9 compare a musical score in a legacy numbered musical notation with that in a musical notation system according to an embodiment of the present application; and FIG. 10 is a schematic view of a structure of a musical notation system according to an embodiment of the present application.

DETAILED DESCRIPTIONS OF THE EMBODIMENTS

Hereinafter, exemplary embodiments of the present application will be described in detail with reference to the accompanying drawings. It is apparent that the described embodiments are only part but not all of the embodiments of the present application. It should be understood that the present application is not limited to the exemplary embodiments described here.

It is well known that a legacy numbered musical notation system is easy for a beginner just getting involved in music to understand and start learning music theory. However, notes in the numbered musical notation merely reflect relative pitch and are not easy to be mapped to keys on a piano keyboard, resulting in difficulty to find the keys on the piano keyboard with reference to a score in the numbered musical notation; thus, it is quite hard to play piano by using the numbered musical notation. In addition, white keys and black keys on the piano keyboard are not reflected at all in the numbered musical notation, causing further difficulty to play piano by using the numbered musical notation.

Furthermore, a traditional twelve-tone equal temperament is based on a natural scale representing white keys on a piano keyboard, introducing sharps and flats of the natural scale notes where black keys on the piano keyboard are also considered as independent notes and semitones between major second intervals are uniformly expressed as an average tone, whether expressed in sharps or flats, which facilitates creation and performance of piano music. However, in the traditional twelve-tone equal temperament, the independent semitones are still expressed in the sharps or flats of the natural scale, and reading and singing musical scores are still very inconvenient.

Musical notation systems proposed in the present application not only make improvement on the legacy numbered musical notation system, where white keys and black keys on a piano keyboard are reflected respectively in the musical notation so that a pitch symbol in a musical score is directly mapped to a key on the piano keyboard; but also directly give a pitch symbol corresponding to a black key on the piano keyboard a new sol-fa name independent of the natural scale notes, thereby making it quite simple and easy to read and sing a musical score while viewing the musical score recorded with the musical notation system of the present application, and making easier learning, understanding and applying the music theory.

Figure 1:
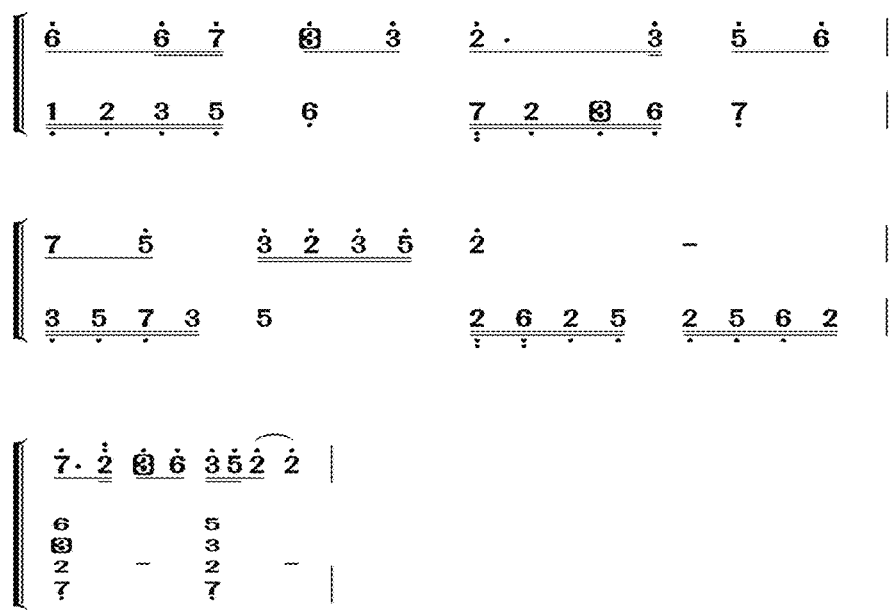
FIG. 1 is a schematic view of a structure of a musical notation system according to an embodiment of the present application.

FIG. 1 is a schematic view of a structure of a musical notation system according to an embodiment of the present application.

As shown in FIG. 1, the musical notation system according to an embodiment of the present application includes a pitch symbol and a duration symbol. Compared with the legacy numbered musical notation system, the musical notation system according to an embodiment of the present application makes improvement on the pitch symbol to represent directly a key on the piano keyboard with the pitch symbol corresponding to a number representing a pitch in the numbered musical notation system. As shown in FIG. 1, a number can be used to represent a pitch, just like 1, 2, 3, 4, 5, 6, 7 used in the numbered musical notation system. However, the pitch symbols representing a white key and a black key of the piano keyboard in FIG. 1 are shown respectively in different forms: in FIG. 1, the number mapped to the white key is shown in a normal form (black character on white background), while the number mapped to the black key is shown in a reverse display form (white character on black background), and optional display forms further include a number in a circle, for example, ②. Any other pre-defined form can also be used so long as the display form used by the number mapped to the white key can be distinctive from that used by the number mapped to the black key.

In the musical notation system according to an embodiment of the present application, the duration symbol, that is, the symbol representing a duration of a note, can adopt a representation form in the numbered musical notation system.

Figure 2:
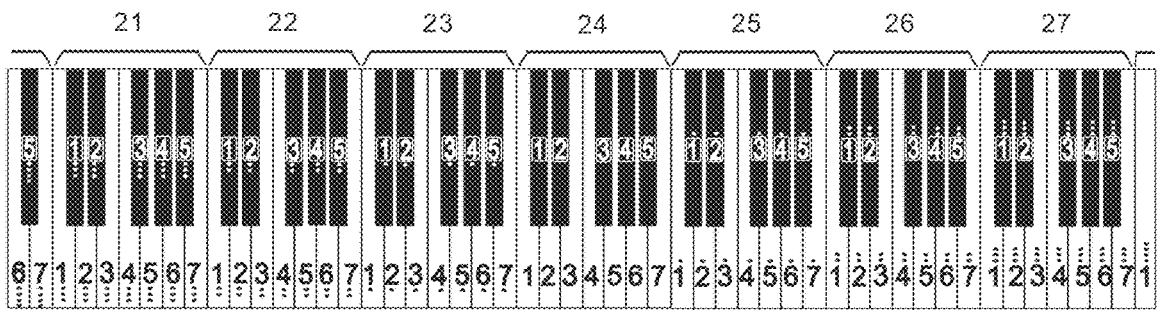
FIG. 2 is a schematic view of correspondence between a piano keyboard and pitch symbols in a musical notation system according to an embodiment of the present application.
Figure 3:
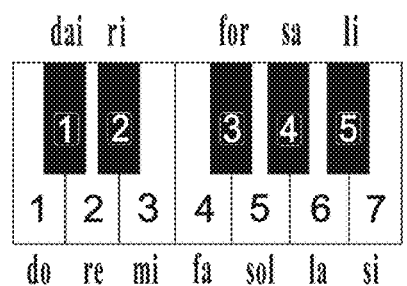
FIG. 3 is an enlarged schematic view of a group of sub-keyboard in FIG. 2.

FIG. 2 is a schematic view of correspondence between a piano keyboard and pitch symbols in a musical notation system according to an embodiment of the present application, and FIG. 3 is an enlarged schematic view of a group of sub-keyboard in FIG. 2.

As shown in FIG. 2, the piano keyboard consists of 52 white keys and 36 black keys, including 7 groups of sub-keyboards in addition to leftmost 3 keys and one rightmost key, where each group of sub-keyboard consists of 7 white keys (expressed as C, D, E, F, G, A, B) and 5 black keys (expressed as $^\#$C, $^\#$D, $^\#$F, $^\#$G, $^\#$A), and corresponding keys in neighboring groups of sub-keyboards differ octave in pitch. The 7 groups of sub-keyboards are successively from low to high in pitch: contra octave 21, great octave 22, small octave 23, one-line octave 24, two-line octave 25, three-line octave 26 and four-line octave 27. The leftmost 3 keys and one rightmost key belong to sub-contra octave and five-line octave respectively. It is known in the art that the above arrangement of the piano keyboard is equivalently applicable to that of other keyboard instruments.

As shown in FIG. 2, in each group of sub-keyboard in the musical notation system according to an embodiment of the present application, the 7 white keys can be represented by 1, 2, 3, 4, 5, 6, 7 (solfège (sol-fa names): do, re, mi, fa, sol, la, si) and the 5 black keys can be represented by 1, 2, 3, 4, 5. The different groups of sub-keyboards can be represented by adding a dot over or under the number where a dot over the number is added to represent an octave higher in pitch and a dot under the number is added to represent an octave lower in pitch, and the number without any dot represents an absolute high in pitch of a note in the one-line octave 24 of the piano keyboard.

As shown in FIG. 3, each group of sub-keyboard has 12 keys including white keys and black keys, where the pitches of adjacent keys differ by a semitone. In the embodiment of the present application, the pitch symbols corresponding to the black keys are directly assigned independent sol-fa names, which are different from the sol-fa names of the pitch symbols (natural notes) corresponding to the white keys. The sol-fa names of natural notes 1, 2, 3, 4, 5, 6, 7 are usually "do", "re", "mi", "fa", "sol", "la", "si"; and in the embodiment of the present application, the sol-fa names "dai", "ri", "for", "sa" and "li" are assigned respectively to the pitch symbols 1, 2, 3, 4 and 5 representing the black keys. Therefore, in the embodiment of the present application, the musical notation system has 12 independent sol-fa names, and the two adjacent notes are all semitone apart to form a unified interval, which greatly simplifies difficulty of understanding and practicing the musical notation system. In the embodiment of the present application, the notes corresponding to the 12 keys all have independent sol-fa names as "do", "dai", "re", "ri", "mi", "fa", "for", "sol", "sa", "la", "li" and "si" in a pitch ascending order. It can be seen that each of the five added sol-fa names has the same consonant as the sol-fa name of the adjacent key with a lower semitone, which is easier to merge with the original natural scale sol-fa names, and easier to learn and practice.

In traditional music notation systems, the twelve-tone equal temperament system still uses the sol-fa names of the seven natural scale notes while the added five semitones do not have independent sol-fa names and only rely on the sol-fa names of natural scale notes. For example, the semitone between 4 ("fa") and 5 ("sol"), sung as "fa sharp" or "sol flat", is taught little in an initial popularized introduction to the traditional music theory, because it requires two syllables to pronounce and has different pronunciation, especially when there are a large number of notes to sing quickly, it is difficult to sing "sharp" and "flat" and it is easy for learners and listeners to have the illusion of "fa" or "sol". In the embodiment of the present application, the added five semitones are clearly assigned to "dai", "ri", "for", "sa" and "li". Compared with the twelve-tone equal temperament system identifying the added five semitones by noting "sharp" and "flat" to the natural scale notes, 12 independent sol-fa names do not cause confusion, so it is not only conducive to quick reading of scores, but also more conducive to teaching of music theory, especially when five semitones are required. Thus, the teaching is made simple and accurate, which lays a solid foundation for learning musical intervals and chords and reading and mastering complex musical scores.

In one embodiment, the pitch symbol in the musical notation system according to an embodiment of the present application can also adopt a letter like C, D, E, F, G, A, or B expressing a pitch name (letter notation).

In another embodiment, the pitch symbol in the musical notation system according to an embodiment of the present application can adopt a tag other than the dot (for example, A) to represent the octave change in pitch.

In traditional music teaching, musical intervals are expressed in "degrees", such as major thirds and minor thirds. An interval including all whole steps is called "major n degree" and that including a half step (semitone) is called "minor n degree" (n is an integer more than 1), which makes many music lovers discouraged. Even for people with a certain musical foundation, it is not easy to completely master this term. Because adjacent notes in the natural scale contain 2 semitone intervals or 1 semitone interval, there is considerable difficulty for the learner of music to completely master the musical interval, even leading to abandoning the learning of the musical score and becoming a hindrance to learning the music theory. In the musical notation system according to an embodiment of the present application, the semitone can be used as a basic unit, instead of the concept of "degree", and it becomes quite simple to completely grasp the musical interval. For example, the major third is 4 semitones, and the minor third is 3 semitones. Moreover, with the help of 12 independent sol-fa names, each semitone can be independently identified without confusion. As a result, learning the music theory becomes simple, and the concept of musical intervals can be quickly understood and mastered.

Figure 4:
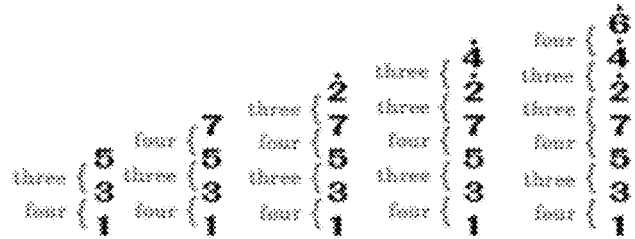
FIG. 4 is a schematic view of chords in a musical notation system according to an embodiment of the present application.
Figure 4:
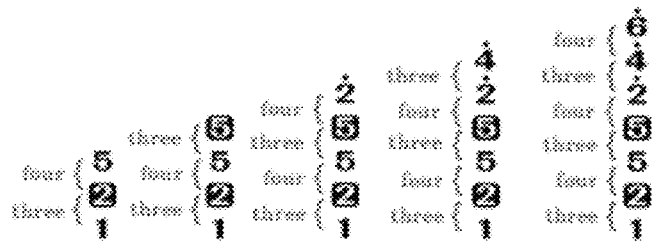
Figure 4:
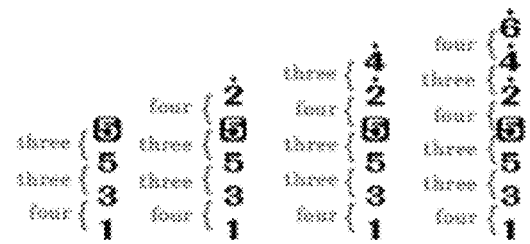

FIG. 4 is a schematic view of chords in a musical notation system according to an embodiment of the present application.

In the musical notation system according to an embodiment of the present application, an original complicated chord concept can also be quickly understood and used. Because a chord is superimposed based on a certain interval relationship, even music professionals are discouraged by some complicated chords when using the original staff. In the traditional musical notation system, notes in a chord are in units of "degrees" of the interval. Since there is a difference between "major n degrees" and "minor n degrees", the chords by superimposing the intervals become more complicated and difficult to grasp. As shown in FIG. 4, illustrated are C major chords, C minor chords, and C dominant chords in the musical notation system according to an embodiment of the present application. Among them, a number of semitones between chord notes is marked for each listed chord, under which a first line lists traditional chord names, for example, C, Cmaj7, . . . in the C major chords . . . , Cm, Cm7, . . . in the C minor chords, and C7, C9, . . . in the C dominant chords; a second line lists corresponding chord names in the musical notation system according to an embodiment of the present application, for example, corresponding to $1_C$, $1_{maj7}$, . . . in the C major chords, $1_m$, $1_{m7}$, . . . in the C minor chords, and $1_7$, $1_9$, . . . in the C dominant chords, where 1 represents a root note of the chord. Other chords are in a same manner, for example, $5_C$ and $2_{11}$ respectively represent a major chord with the root note of 5 (note G sung as sol), and an dominant $11^{th}$ chord with the root note of 2 (note D sung as re). With regard to modified chords, in the musical notation system according to an embodiment of the present application, as long as the number of semitones between chord notes is identified, it becomes quite easy to understand and grasp a modified chord. Therefore, in a musical notation system according to an embodiment of the present application, even for complex chords, since regularity of the number of semitones between chord notes is simple and easily discernable, it becomes relatively easy to understand and grasp complex chords, which breaks a barrier of learning traditional music theory.

Figure 5:
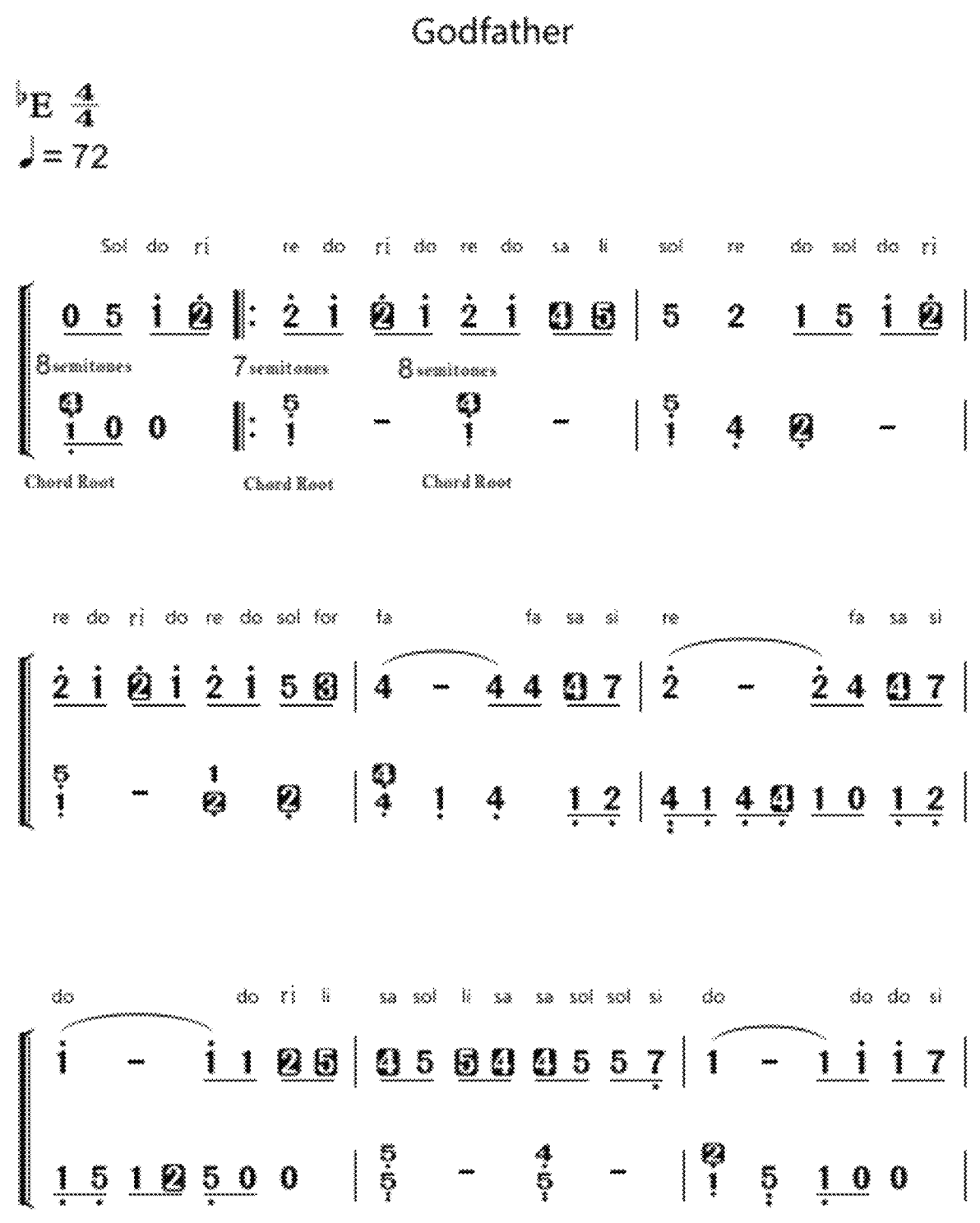

Especially in jazz, it is quite difficult to record impromptu accompaniment chords with staffs. By using the musical notation system according to an embodiment of the present application, not only recording impromptu accompaniment becomes simple, but also using the 12 independent sol-fa names is more helpful to read and sing the score of the impromptu accompaniment. FIG. 5 is a schematic view of a musical score by applying a musical notation system according to an embodiment of the present application. As shown in FIG. 5, a first line shows a melody of God father, which also gives the sol-fa name of each note in the melody, making reading and singing the score of the melody quite easy. Second and third lines show the score of the accompaniment part (chords), and also indicate the number of semitones of intervals between the chord notes in the first 3 chords. It can be seen that even impromptu accompaniment can be recorded accurately and easily.

Figure 7:
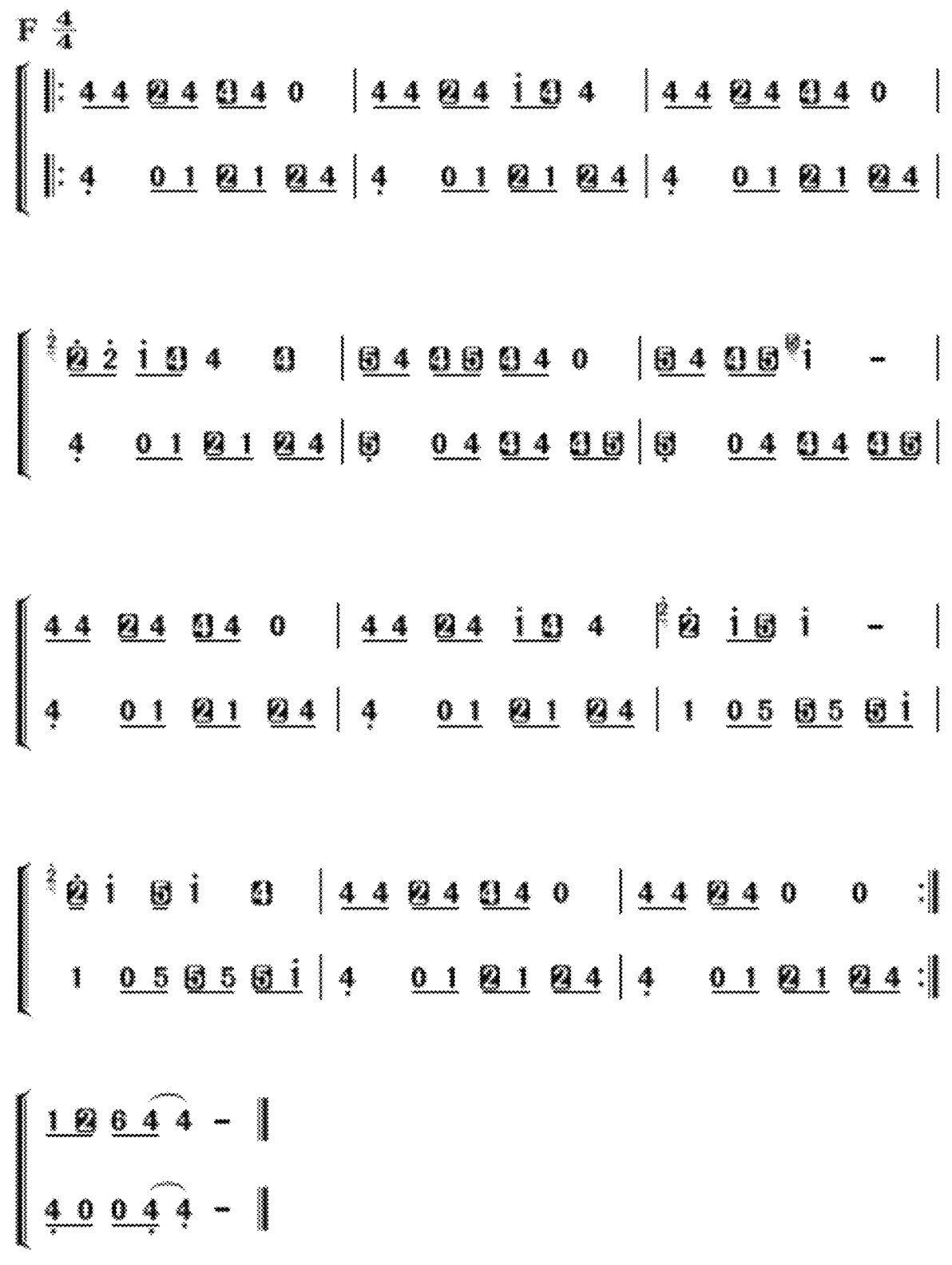
Figure 7A:
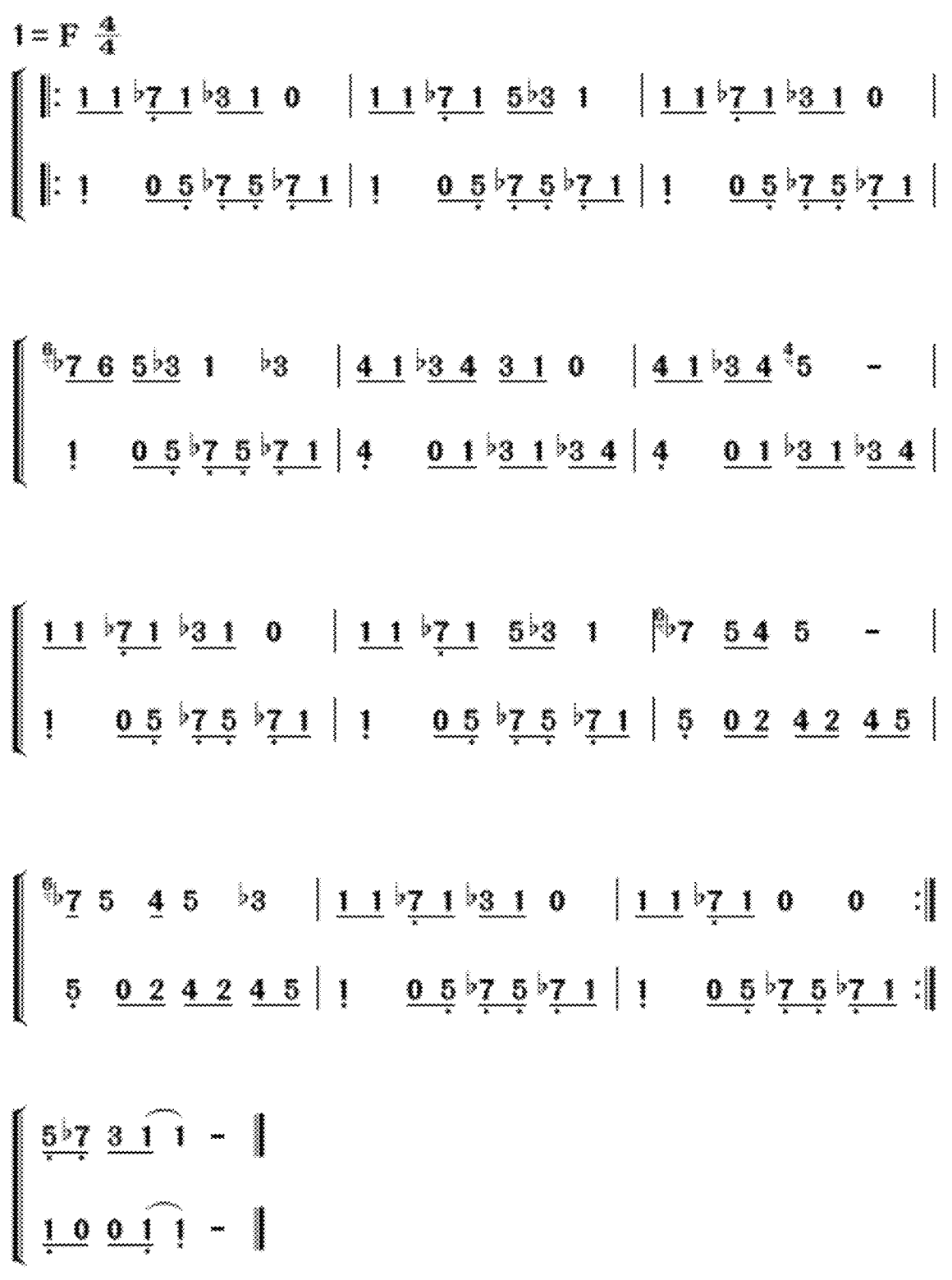

Furthermore, each country features its own music style on a main reason that countries have differences in their characteristic scales, each having its own charm. With the musical notation system according to an embodiment of the present application, especially with the help of 12 independent sol-fa names, based on the number of semitones between two from the 12 notes, it is easier to understand and master the characteristic scales, which facilitates music exchanges between countries to promote the world's cultural exchanges; through drawing on each other's strengths and weaknesses, countries will develop together and make progress together, which will be conducive to music fusion from all over the world. FIG. 6 is a schematic view of scales of various musical styles by applying a musical notation system according to an embodiment of the present application. As shown in FIG. 6, listed are a natural major scale, a natural minor scale, a harmony minor scale, a Chinese pentatonic scale, a Japanese minor pentatonic scale, a classical melody minor scale and blues scale in the musical notation system according to an embodiment of the present application, where each scale ends with a note an octave higher than the start note in pitch, and where a distance between adjacent scale notes and vertical alignment between scales can indicate similarities and differences in number of semitones. In particular, sorting the sol-fa names in pitch ascending order, the blues scale is la, li, do, re, ri, fa, for, la, and the numbers of semitones between adjacent scale notes are 1, 2, 2, 1, 2, 1, 3, in total of 12 semitones. FIG. 7A and FIG. 7 compare a musical score in a legacy numbered musical notation with that in a musical notation system according to an embodiment of the present application. FIG. 7 and FIG. 7A show the scores of "Treble Blues" respectively by applying the musical notation system according to an embodiment of the present application, and traditional numbered musical notation, embodying the Blues music style, in which the Blues scale can be seen used in the score. The numbered musical notation shown in FIG. 7A uses many 7 flat and 3 flat notes, which will hinder ordinary learners based on the natural scale when reading and singing the score. On the other hand, for music lovers learning the musical notation system according to an embodiment of the present application, with the help of 12 independent sol-fa names, the score shown in FIG. 7 is easy to read and sing, so that it is easy to grasp the Blues music style. Therefore, with the musical notation system according to an embodiment of the present application, any change in various music styles is inseparable from these 12 notes identified by the independent sol-fa names; whether beginners or music fans with a certain foundation, can quickly recognize and sing out the notes in the score accurately, which is conducive to the learning, understanding and spread of music.

Especially, for blind people, they are relatively more sensitive to sound because of visual impairment. With the musical notation system according to an embodiment of the present application, with 12 independent sol-fa names as an aid, a blind person can quickly grasp a musical score with the help of sound from the sol-fa names. In addition, the musical notation system according to an embodiment of the present application uses a number to represent a musical note, and Braille digital representations can be used to construct a Braille score so that blind people can read the score by touching. Therefore, compared with the traditional musical notation system, blind people no longer cannot see and touch a score like they did before, but also involve complex problems that are difficult to solve, such as sharps and flats and modulation. On this basis, Braille digital representations can also be applied to an expression of chords, so that the blind can also master a chord in a Braille score. By touching a Braille music score and using 12 independent sol-fa names to sing the score, a "solfège" by the blind can be achieved, which brings good news for the blind to learn music, especially to learn to master a score.

Figure 8:
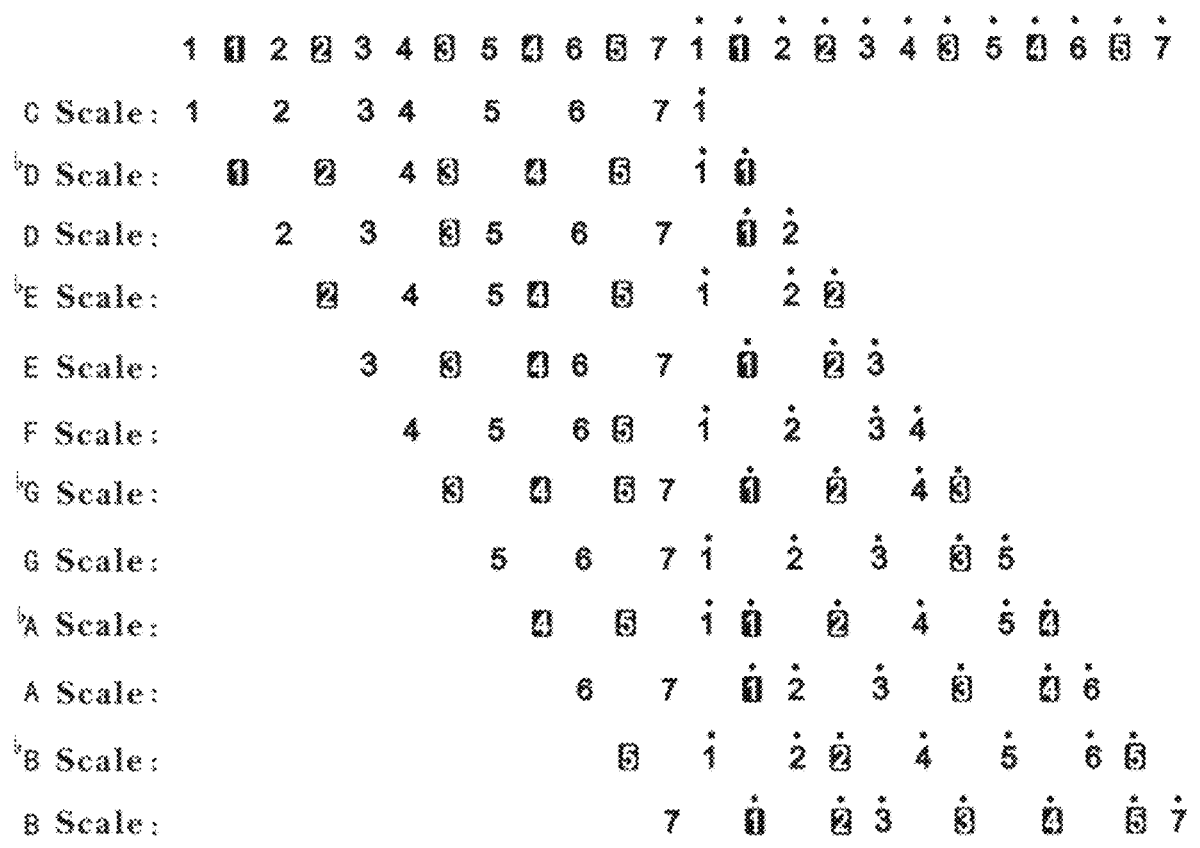
Figure 9:
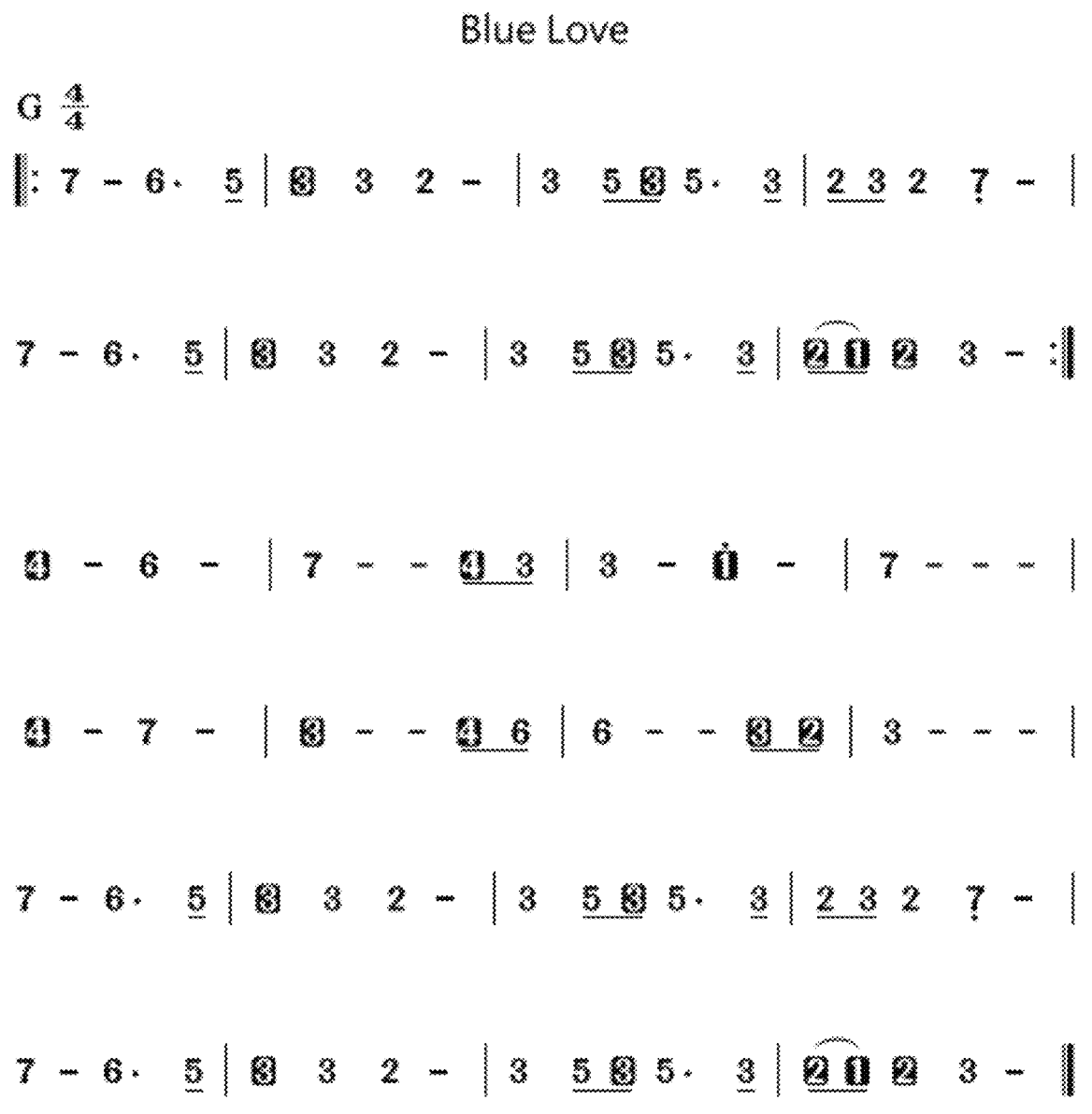

For a musical score notated with a traditional musical notation system, in order to reduce the large number of sharps or flats caused by using a fixed pitch, mode is used, which is a concept based on a natural scale. FIG. 8 is a schematic view of major scales by applying a musical notation system according to an embodiment of the present application. As shown in FIG. 8, 12 major scales are natural scales that start with one of 12 semitones in an octave, respectively. Similar to FIG. 6, each scale ends with a note an octave higher than the start note in pitch, and where a distance between adjacent scale notes and vertical alignment between scales can indicate similarities and differences in number of semitones. In the natural scale, only two places between adjacent scale notes are half-tone distances, so-called minor seconds, and others are major seconds, which can be seen at a glance according to FIG. 8. In fact, in the musical notation system according to an embodiment of the present application, all 12 semitones are given independent sol-fa names, no longer based on the natural scale, and it is unnecessary to use the concept of mode. The 12 modes shown in FIG. 8 and conversion (ie, modulation) among these modes are only for compatibility with the traditional music notation systems. FIGS. 9B and 9A compare a musical score in a legacy numbered musical notation with that in a musical notation system according to an embodiment of the present application. As shown in FIG. 9A, the musical piece "Blue Love" is expressed with the legacy numbered musical notation and starts with a G key. There are a lot of sharps or flats when the music is expressed in stave, and a lot of sharps or flats are reduced by using a movable do solfège manner with the legacy numbered musical notation. However, because the music has been modulated twice in actual performance, from G key to E key and then back to the original G key, too many sharps or flats hindered the music player, and also caused trouble to ordinary music lovers, which is not conducive to understanding and mastering the mode and modulation. In the musical notation system according to an embodiment of the present application, the above problems can be completely solved. As shown in FIG. 9, using 12 semitones and 12 corresponding independent sol-fa names to directly identify and sing each semitone, without using the concept of mode and modulation, a more concise music theory system can be built; the key G therein is only in order to mark the key in the traditional musical score, and maintain compatibility with the traditional musical notation system, making music theory and practice concise and easy to master.

Therefore, with the musical notation system according to the present embodiment, the 5 semitones that represent the black keys other than the 7 natural scale notes are clearly assigned separate sol-fa names, so that each semitone note in an octave group can be sung with an independent sol-fa name, indicating that the 5 semitones representing the black keys can be applied conveniently and accurately in music practice to form a musical notation system with music theory and practice unified, which breaks through the traditional music system based on the natural scale. With the 12 independent sol-fa names, a fixed do solfège method can become a normal method of reading and sing a score, and a more concise music theory system can be constructed, so the mode and modulation will become unnecessary. Moreover, the music styles formed from the 12 independent sol-fa names can be more colorful, opening up a wider world of music, and also more concise and easy to master than the twelve-tone equal temperament system using sharps or flats, which is not only conducive to fast reading of scores, but also to music teaching, making teaching simple and accurate. Especially for those knowing a little about the numbered musical notation system, it is quite easy to grasp the musical notation system according to the present embodiment.

For those knowing nothing about the numbered musical notation system, the present application further proposes following musical notation system.

Figure 10:
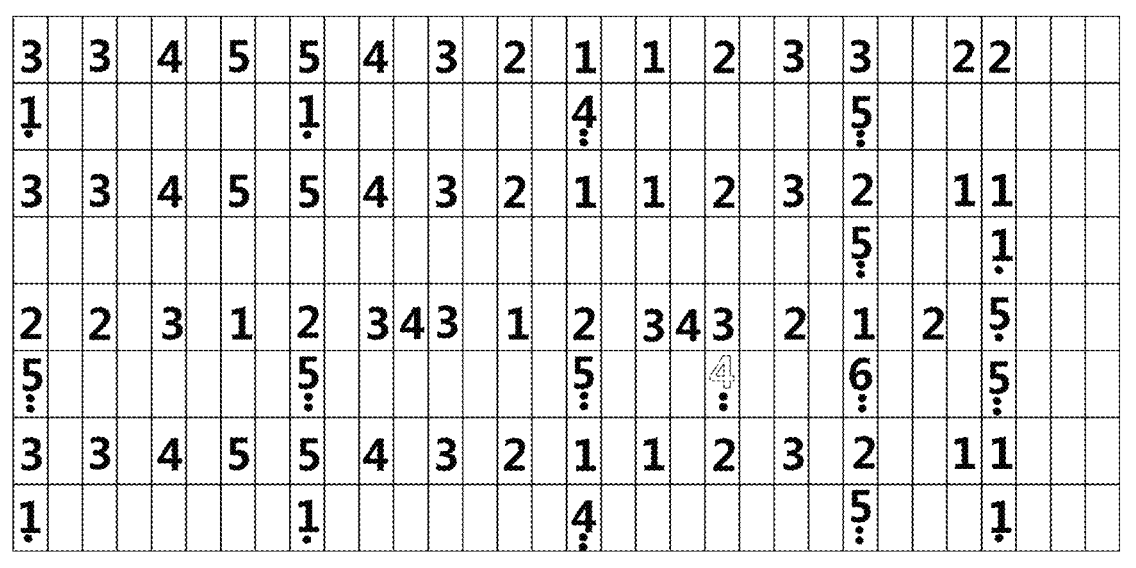

FIG. 10 is a schematic view of a structure of a musical notation system according to another embodiment of the present application.

As shown in FIG. 10, the musical notation system according to another embodiment of the present application includes a pitch symbol and a duration symbol represented by using a grid. One grid represents a minimum fixed duration of a note which can be either a minimum duration of a score or a set possible minimum duration. For example, a score "Ode to joy" as shown in FIG. 4 has an eighth note or a quaver as a minimum duration unit (half beat), so each grid shown represents a half beat (eighth note) and each grid can represent "pressing a key" for a fixed duration (half beat).

Likewise, the musical notation system according to another embodiment of the present application also uses the pitch symbol to directly represent the piano keyboard (or a keyboard of a keyboard instrument), corresponding to a number representing a pitch in the numbered musical notation system. As shown in FIG. 10, a number can be used to represent a pitch, just like 1, 2, 3, 4, 5, 6, 7 used in the numbered musical notation system. However, the pitch symbols representing a white key and a black key of the piano keyboard in FIG. 10 are shown respectively in different forms: in FIG. 10, the number mapped to the white key is shown in a normal form (black character on white background), while the number mapped to the black key is shown in a reverse display form (white character on black background), and optional display forms further include a hollow number such as A in FIG. 10.

Likewise, as shown in FIG. 2, in each group of sub-keyboard in the musical notation system according to another embodiment of the present application, the 7 white keys can be represented by 1, 2, 3, 4, 5, 6, 7 (solfège: do, re, mi, fa, sol, la, si) and the 5 black keys can be represented by 1, 2, 3, 4, 5. The different groups of sub-keyboards can be represented by adding a dot over or under the number where a dot over the number is added to represent an octave higher in pitch and a dot under the number is added to represent an octave lower in pitch, and the number without any dot represents an absolute high of a note in the one-line octave 24 of the piano keyboard. As described above, as shown in FIG. 3, by giving semitones represented by the 5 black keys sol-fa names independent of the natural scale notes represented by the 7 white keys, and the sol-fa names "dai", "ri", "for", "sa", and "li" can be assigned respectively to the pitch symbols 1, 2, 3, 4 and 5 representing the black keys. Therefore, the 12 keys all have independent sol-fa names as "do", "dai", "re", "ri", "mi", "fa", "for", "sol", "sa", "la", "li" and "si" in a pitch ascending order.

Furthermore, in the musical notation system according to another embodiment of the present application, the pitch symbol within a grid represents a note with the pitch having a minimum fixed duration, and one or more continuous blank grids just after the grid with the pitch symbol represent the pitch continuing the duration represented by the blank grids. For example, starting the score as shown in FIG. 10, a blank grid just after a grid embracing a starting pitch 3 and before a grid embracing another pitch 3, represents the note 3 (the key E in the one-line octave of the piano keyboard) with a duration represented by two grids (one beat), followed by another note 3. Thus, when playing a keyboard instrument, the key E in the one-line octave of the keyboard is pressed for one beat duration; and it is intuitive and very easy to play a keyboard instrument by following such score visually.

In one embodiment, the pitch symbol in the musical notation system according to another embodiment of the present application can also adopt a letter like C, D, E, F, G, A, or B expressing a pitch name.

In another embodiment, the pitch symbol in the musical notation system according to another embodiment of the present application can adopt a tag other than the dot (for example, ^) to represent the octave change in pitch.

Likewise, in one embodiment, Braille digital representations can be used to construct a Braille score so that blind people can read the score by touching. On this basis, Braille digital representations can also be applied to an expression of chords, so that the blind can also master a chord in a Braille score. By touching a Braille music score and using 12 independent sol-fa names to sing the score, a "solfège" by the blind can be achieved, which brings a good news for the blind to learn music, especially to learn to master a score.

Therefore, with the musical notation system according to the present embodiment, a music beginner knowing nothing about the numbered musical notation system can easily locate keys on a keyboard of a keyboard instrument according to the score, thereby easily starting playing the keyboard instrument, which greatly lowers a threshold of playing the keyboard instrument. For those beginners knowing nothing about the numbered musical notation system, by mastering the 12 independent sol-fa names and their pitches, it is not only conducive to quick reading of scores, but also to music theory teaching, especially where the five semitones are needed, making the teaching simple and accurate and making it easier to get started with music theory.

The embodiments of the present application have been described above. The above descriptions are exemplary but not exhaustive, and the present application is not limited to the embodiments disclosed. Various modifications and alterations are obvious to a person of ordinary skill in the art without departing from the spirit and scope of the described embodiments. Therefore, the protection scope of the present application shall be defined by the appended claims.

What is claimed:

1. A musical notation system, comprising:
   a pitch symbol representing a key of a keyboard instrument, wherein the pitch symbol corresponds to a number representing a pitch in a numbered musical notation system, and is displayed in a first form when representing a white key of the keyboard instrument and in a second form when representing a black key of the keyboard instrument; and
   a duration symbol representing a duration of the pitch symbol, the duration symbol corresponding to a symbol representing a duration in the numbered musical notation system,
   wherein the pitch symbol representing the black key of the keyboard instrument is assigned a sol-fa name independent of a sol-fa name of the pitch symbol representing the white key of the keyboard instrument.

2. The musical notation system of claim 1, wherein:
   the pitch symbol representing a white key comprises a number from 1, 2, 3, 4, 5, 6, 7, and
   the pitch symbol representing a black key comprises a number from 1, 2, 3, 4, 5.

3. The musical notation system of claim 2, wherein:
   sol-fa names "dai", "ri", "for", "sa" and "li" are assigned respectively to the pitch symbols 1, 2, 3, 4 and 5 representing the black keys.

4. The musical notation system of claim 2, wherein:
   a Braille digital representation is applied to the pitch symbol.

5. The musical notation system of claim 2, wherein:
   the pitch symbol further comprises a tag over or under the number, respectively representing an octave higher or lower in pitch in the numbered musical notation system.

6. The musical notation system of claim 5, wherein:
   the tag comprises at least one of a dot, a caret, or a pre-defined mark.

7. The musical notation system of claim 6, wherein:
   the pitch symbol comprises the number without any tag, representing an absolute high in pitch of a note in one-line octave of a keyboard instrument.

8. The musical notation system of claim 1, wherein:
   the first form comprises a form of black character and white background; and
   the second form comprises at least one of a display form of white character and black background, a number in a circle, or any other pre-defined form differing from the first form.

9. A musical notation system, comprising:

a grid representing a minimum fixed duration of a note; and a pitch symbol representing a key of a keyboard instrument, wherein the pitch symbol corresponds to a number representing a pitch in a numbered musical notation system, and is displayed in a first form when representing a white key of the keyboard instrument and in a second form when representing a black key of the keyboard instrument, wherein the pitch symbol within the grid represents a note with the pitch having the minimum fixed duration; and wherein the pitch symbol representing the black key of the keyboard instrument is assigned a sol-fa name independent of a sol-fa name of the pitch symbol representing the white key of the keyboard instrument.

10. The musical notation system of claim 9, wherein:

the pitch symbol representing a white key comprises a number from 1, 2, 3, 4, 5, 6, 7, and the pitch symbol representing a black key comprises a number from 1, 2, 3, 4, 5.

11. The musical notation system of claim 10, wherein:

sol-fa names "dai", "ri", "for", "sa" and "li" are assigned respectively to the pitch symbols 1, 2, 3, 4 and 5 representing the black keys.

12. The musical notation system of claim 10, wherein:

a Braille digital representation is applied to the pitch symbol.

13. The musical notation system of claim 10, wherein:

the pitch symbol further comprises a tag over or under the number, respectively representing an octave higher or lower in pitch in the numbered musical notation system.

14. The musical notation system of claim 13, wherein:

the tag comprises at least one of a dot, a caret, or a pre-defined mark.

15. The musical notation system of claim 13, wherein:

the pitch symbol comprises the number without any tag, representing an absolute high in pitch of a note in one-line octave of a keyboard instrument.

16. The musical notation system of claim 9, wherein:

the first form comprises a form of black character and white background; and the second form comprises at least one of a display form of white character and black background, a number in a circle, or any other pre-defined form differing from the first form.

17. The musical notation system of claim 9, wherein:

one or more continuous blank grids just after the grid with the pitch symbol represent the pitch continuing the duration represented by the blank grids.

* * * * *